United States Patent
Mori

(10) Patent No.: US 10,437,888 B2
(45) Date of Patent: Oct. 8, 2019

(54) INFORMATION PROCESSING APPARATUS

(71) Applicant: Shinya Mori, Kanagawa (JP)

(72) Inventor: Shinya Mori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 476 days.

(21) Appl. No.: 15/076,387

(22) Filed: Mar. 21, 2016

(65) Prior Publication Data

US 2016/0277540 A1    Sep. 22, 2016

(30) Foreign Application Priority Data

Mar. 20, 2015  (JP) ................. 2015-058404

(51) Int. Cl.
*G06F 16/903* (2019.01)
*H04L 29/08* (2006.01)

(52) U.S. Cl.
CPC ........ *G06F 16/90335* (2019.01); *H04L 67/12* (2013.01)

(58) Field of Classification Search
CPC .. G06F 19/00; G06F 19/3456; G06F 19/3462; G06F 19/3475; G06F 19/3418; G06F 19/30; G06F 19/321; G06F 19/328; G06F 21/608; G06F 3/1204; G06F 3/1205; G06F 3/1238; G06F 3/1267; G06F 17/30979; G06Q 20/102; G06Q 50/24; G06Q 30/04; H04L 67/12; H04L 67/2819; H04L 67/2842; H04N 1/32; H04N 1/00281; H04N 1/00132; H04N 1/00143; H04N 1/00145; H04N 1/00185; H04N 1/00188; H04N 1/00204; H04N 1/00206; H04N 1/00209; H04N 1/00236; H04N 1/00238; H04N 1/00244; H04N 1/32502; H04N 1/32529; H04N 1/00214; H04N 1/00318;
(Continued)

(56) References Cited

U.S. PATENT DOCUMENTS 6,772,943 B2 * 8/2004 Segal ................ G06F 17/30011
235/375
6,775,729 B1 * 8/2004 Matsuo ................ G06F 3/1211
710/260
(Continued)

FOREIGN PATENT DOCUMENTS

JP    2013-008353    1/2001
JP    2009-211720 A    9/2009
(Continued)

OTHER PUBLICATIONS

Office Action dated Sep. 4, 2018 in Japanese Patent Application No. 2015/058404, 3 pages.

*Primary Examiner* — Greg C Bengzon
(74) *Attorney, Agent, or Firm* — Oblon, McClelland, Maier & Neustadt, L.L.P.

(57) ABSTRACT

An information processing apparatus and method. The information processing apparatus has circuitry to extract metadata from output data which includes one or more sets of documents. A number is allocated to each of the one or more sets of documents, the allocated number corresponding to the number of a plurality of output apparatuses. An output destination is determined from among the plurality of output apparatuses based on the allocated number, and the output data is transmitted to the determined output apparatus.

4 Claims, 11 Drawing Sheets

(58) Field of Classification Search
CPC .......... H04N 1/32042; H04N 1/32085; H04N 1/32096; H04N 1/32101; H04N 1/32122; H04N 1/32128; H04N 1/32523; H04N 1/32539; H04N 1/32545; H04N 1/3255; H04W 4/70
See application file for complete search history.

(56) References Cited

U.S. PATENT DOCUMENTS

| | | | | |
|---|---|---|---|---|
| 6,781,708 | B1* | 8/2004 | Wada | G06F 3/1204 358/1.12 |
| 6,912,061 | B1* | 6/2005 | Ozaki | H04N 1/00641 358/1.15 |
| 6,985,245 | B1* | 1/2006 | Takahashi | G06K 15/00 358/1.11 |
| 7,046,391 | B1* | 5/2006 | Barry | G06F 3/1208 358/1.9 |
| 8,508,757 | B1* | 8/2013 | Koehl | G06F 19/326 358/1.13 |
| 9,967,416 | B2* | 5/2018 | Fallon | H04N 1/00843 |
| 2001/0055123 | A1* | 12/2001 | Ryan | G06Q 10/06 358/1.12 |
| 2004/0054685 | A1* | 3/2004 | Rahn | G06Q 40/02 |
| 2005/0280861 | A1* | 12/2005 | Shima | H04N 1/00954 358/1.15 |
| 2006/0036934 | A1* | 2/2006 | Fujiwara | G06F 17/30011 715/203 |
| 2006/0139679 | A1* | 6/2006 | Barry | G06F 3/1212 358/1.13 |
| 2006/0271634 | A1* | 11/2006 | England | H04L 67/2823 709/206 |
| 2007/0133044 | A1* | 6/2007 | Tanaka | G06F 21/608 358/1.15 |
| 2007/0164096 | A1* | 7/2007 | Banfield | G06F 19/3462 235/375 |
| 2011/0158727 | A1* | 6/2011 | Yamakawa | H04N 1/00222 399/407 |
| 2014/0092424 | A1* | 4/2014 | Grosz | G06F 3/1242 358/1.15 |
| 2015/0278669 | A1* | 10/2015 | Akiyama | G06K 15/4095 358/1.14 |
| 2017/0214825 | A1* | 7/2017 | Koehl | G06F 19/326 |

FOREIGN PATENT DOCUMENTS

| | | |
|---|---|---|
| JP | 2014-44696 A | 3/2014 |
| JP | 2015-215825 | 12/2015 |
| WO | WO 2015-174309 A1 | 11/2015 |

\* cited by examiner

FIG. 5

| ID | RULE | CONDITION | ACTION |
|---|---|---|---|
| 1 | IF JUDGEMENT INFORMATION IS "001", OUTPUT TO "OUTPUT APPARATUS 20A" | JUDGEMENT INFORMATION: "001" | DETERMINE OUTPUT DESTINATION IS "OUTPUT APPARATUS 20A" |
| 2 | IF JUDGEMENT INFORMATION IS "002", OUTPUT TO "OUTPUT APPARATUS 20B" | JUDGEMENT INFORMATION: "002" | DETERMINE OUTPUT DESTINATION IS "OUTPUT APPARATUS 20B" |
| 3 | IF JUDGEMENT INFORMATION IS "000", OUTPUT TO "OUTPUT APPARATUS 20C" | JUDGEMENT INFORMATION: "000" | DETERMINE OUTPUT DESTINATION IS "OUTPUT APPARATUS 20C" |

FIG. 6

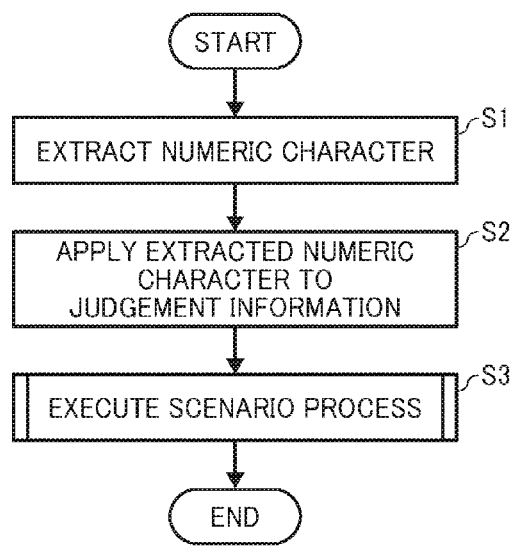

| ALLOCATED NUMBER | EXTRACTED CHARACTER STRING (PATIENT NAME) | DATE INFORMATION |
|---|---|---|
| 001 | ICHIRO RIKO | 2015/2/2/ 15:00 |
| 002 | JIRO RIKO | 2015/2/2/ 15:02 |
| 003 | SABURO RIKO | 2015/2/2/ 15:03 |

| ENTRY ID | STRING (PATIENT NAME) | OUTPUT DESTINATION | DATE INFORMATION |
|---|---|---|---|
| 001 | ICHIRO RIKO | PRINTER A | 2015/2/2/ 15:00 |
| 002 | JIRO RIKO | PRINTER B | 2015/2/2/ 15:02 |
| 003 | SABURO RIKO | PRINTER C | 2015/2/2/ 15:03 |

SELECTION OF OUTPUT DESTINATION ✕

PLEASE SELECT OUTPUT DESTINATION

OUTPUT DESTINATION  [ OUTPUT APPARATUS 20B ▼ ] 301

300  302
[ OK ]  [ CANCEL ]

FIG. 15

| ID | RULE | CONDITION | ACTION |
|---|---|---|---|
| 1 | OUTPUT TO OUTPUT APPARATUS CORRESPONDING TO CHARACTER STORING IN SECOND ASSOCIATION INFORMATION MATCHING PATIENT NAME INCLUDED IN INTERMEDIATE PRINT DATA INCLUDING KEYWORD "BILL" | EXTRACT KEYWORD "BILL" AND STORE CHARACTER STORING MATCHING PATIENT NAME IN SECOND ASSOCIATION INFORMATION STORAGE UNIT | DETERMINE OUTPUT DESTINATION IS OUTPUT APPARATUS HAVING BEEN SORTED |
| 2 | OUTPUT TO OUTPUT APPARATUS 20A IF KEYWORD "PRESCRIPTION" IS EXTRACTED AND STATUS OF OUTPUT APPARATUS 20A IS NON-OUTPUT | EXTRACT KEYWORD "PRESCRIPTION" AND PUT NO PAPER ON CATCH TRAY OF OUTPUT APPARATUS 20A | DETERMINE OUTPUT DESTINATION IS "OUTPUT APPARATUS 20A" |
| 3 | OUTPUT TO OUTPUT APPARATUS 20B IF KEYWORD "PRESCRIPTION" IS EXTRACTED AND STATUS OF OUTPUT APPARATUS 20B IS NON-OUTPUT | EXTRACT KEYWORD "PRESCRIPTION" AND PUT NO PAPER ON CATCH TRAY OF OUTPUT APPARATUS 20B | DETERMINE OUTPUT DESTINATION IS "OUTPUT APPARATUS 20B" |
| 4 | OUTPUT TO OUTPUT APPARATUS 20C IF KEYWORD "PRESCRIPTION" IS EXTRACTED AND STATUS OF OUTPUT APPARATUS 20C IS NON-OUTPUT | EXTRACT KEYWORD "PRESCRIPTION" AND PUT NO PAPER ON CATCH TRAY OF OUTPUT APPARATUS 20C | DETERMINE OUTPUT DESTINATION IS "OUTPUT APPARATUS 20C" |
| 5 | OUTPUT TO OUTPUT APPARATUS SELECTED VIA SELECTION SCREEN IF KEYWORD "PRESCRIPTION" IS EXTRACTED AND STATUS OF ALL OF ABOVE OUTPUT APPARATUSES ARE NOT NON-OUTPUT | EXTRACT KEYWORD "PRESCRIPTION" | DISPLAY SELECTION SCREEN FOR SELECTING OUTPUT APPARATUS AND OUTPUT SELECTED OUTPUT APPARATUS |

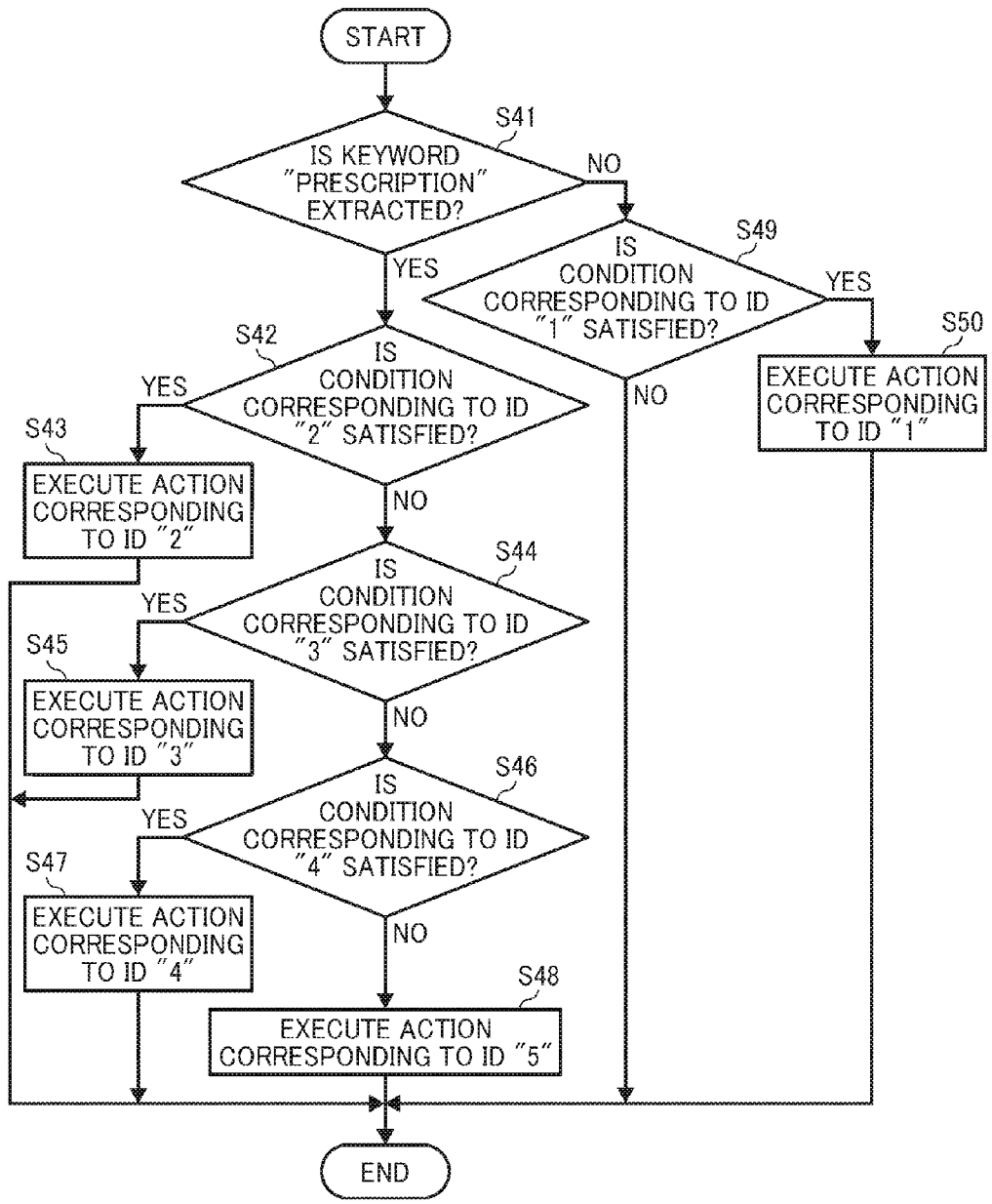

FIG. 18

| ID | RULE | CONDITION | ACTION |
|---|---|---|---|
| 1 | OUTPUT TO OUTPUT APPARATUS CORRESPONDING TO CHARACTER STORING IN SECOND ASSOCIATION INFORMATION MATCHING PATIENT NAME INCLUDED IN INTERMEDIATE PRINT DATA INCLUDING KEYWORD "BILL" | EXTRACT KEYWORD "BILL" AND STORE CHARACTER STORING MATCHING PATIENT NAME IN SECOND ASSOCIATION INFORMATION STORAGE UNIT | DETERMINE OUTPUT DESTINATION IS OUTPUT APPARATUS HAVING BEEN SORTED |
| 2 | OUTPUT TO OUTPUT APPARATUS 20A IF KEYWORD "PRESCRIPTION" IS EXTRACTED AND STATUS OF OUTPUT APPARATUS 20A IS NON-OUTPUT | EXTRACT KEYWORD "PRESCRIPTION" AND PUT NO PAPER ON CATCH TRAY OF OUTPUT APPARATUS 20A | DETERMINE OUTPUT DESTINATION IS "OUTPUT APPARATUS 20A" |
| 3 | OUTPUT TO OUTPUT APPARATUS 20B IF KEYWORD "PRESCRIPTION" IS EXTRACTED AND STATUS OF OUTPUT APPARATUS 20B IS NON-OUTPUT | EXTRACT KEYWORD "PRESCRIPTION" AND PUT NO PAPER ON CATCH TRAY OF OUTPUT APPARATUS 20B | DETERMINE OUTPUT DESTINATION IS "OUTPUT APPARATUS 20B" |
| 4 | OUTPUT TO OUTPUT APPARATUS 20C IF KEYWORD "PRESCRIPTION" IS EXTRACTED AND STATUS OF OUTPUT APPARATUS 20C IS NON-OUTPUT | EXTRACT KEYWORD "PRESCRIPTION" AND PUT NO PAPER ON CATCH TRAY OF OUTPUT APPARATUS 20C | DETERMINE OUTPUT DESTINATION IS "OUTPUT APPARATUS 20C" |
| 5 | STORE INTERMEDIATE PRINT DATA IN OUTPUT DATA STORAGE UNIT IF KEYWORD "PRESCRIPTION" IS EXTRACTED AND STATUS OF ALL OF ABOVE OUTPUT APPARATUSES ARE NOT NON-OUTPUT | EXTRACT KEYWORD "PRESCRIPTION" | STORE INTERMEDIATE PRINT DATA IN OUTPUT DATA STORAGE UNIT |
| 6 | OUTPUT INTERMEDIATE PRINT DATA STORED FIRST IN OUTPUT DATA STORAGE UNIT TO ANY ONE OF ABOVE OUTPUT APPARATUSES OF WHICH STATUS IS NON-OUTPUT | RECEIVE NOTIFICATION OF NON-OUTPUT STATUS FROM ANY ONE OF ABOVE OUTPUT APPARATUSES AND STORE INTERMEDIATE PRINT DATA IN OUTPUT DATA STORAGE UNIT | DETERMINE OUTPUT DESTINATION IS OUTPUT APPARATUS OF SOURCE OF RECEIVED NOTIFICATION |

INFORMATION PROCESSING APPARATUS

CROSS-REFERENCE TO RELATED APPLICATION

The present application is based upon and claims the benefit of priority of Japanese Patent Application No. 2015-058404, filed on Mar. 20, 2015, the entire contents of which are incorporated herein by reference.

BACKGROUND OF THE INVENTION

1. Field of the Invention

An aspect of this disclosure relates to an information processing apparatus.

2. Description of the Related Art

It is known technology that an output destination may be determined based on information extracted from output data such as print data, and the output data is output to the determined output destination.

Japanese Laid-open Patent Application No. 2013-008353 discloses the output destination of a printer is determined based on user information extracted from a print job and a predetermined sorting condition defining an association between a user and a printer.

However the amount of data for the sorting condition increases based on the above Application No. 2013-008353 because all of the association patterns have to be registered.

SUMMARY OF THE INVENTION

In an exemplary implementation, there is provided an information processing apparatus, comprising circuitry configured to extract metadata from output data including one or more sets of document; allocate a number to each of the one or more sets of document, the allocated number corresponding to the number of a plurality of output apparatuses and determined based on the extracted metadata; determine output destination from among the plurality of output apparatuses based on the allocated number; and sort the output data to the determined output apparatus.

BRIEF DESCRIPTION OF THE DRAWINGS

FIG. 5 illustrates a table of an exemplary configuration of the condition information.

FIG. 6 illustrates a flowchart of an exemplary process performed by the print flow plug-in in the client terminal.

FIG. 15 illustrates a table of an exemplary configuration of the condition information.

FIG. 16 illustrates a flowchart of an exemplary process performed by the print flow plug-in.

FIG. 17 illustrates a flowchart of an exemplary scenario process performed by the print flow plug-in in the client terminal.

FIG. 18 illustrates one example of the condition information of the exemplary print system.

DESCRIPTION OF THE PREFERRED EMBODIMENTS

The present invention is described based on a print system which is one example of output system. But the present invention is not limited to the print system. The present invention can be applied to an output system outputting output data. For example, the output process is one of print, project, display and transmit processes.

<First Embodiment>

Figure 1:
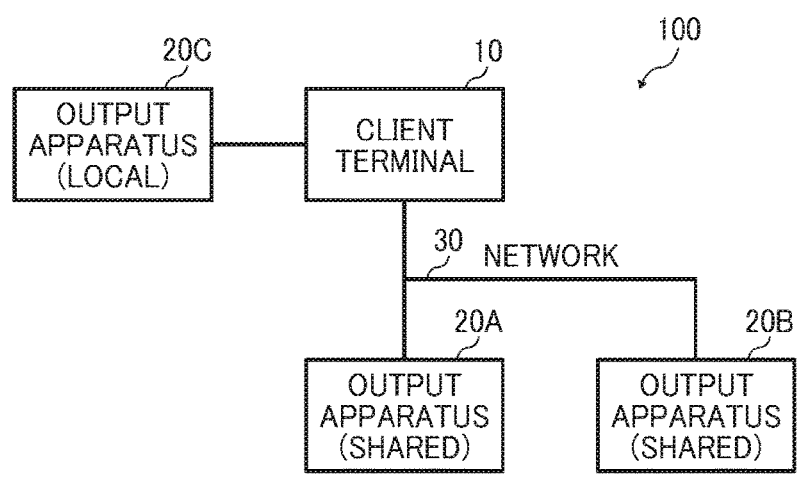
FIG. 1 illustrates an exemplary configuration of a print system.

FIG. 1 illustrates an exemplary configuration of a print system 100 related to this embodiment. As illustrated by FIG. 1, the print system 100 includes a client terminal 10, a shared output apparatuses 20A and 20B connected to each other via a network 30. The print system also includes a local output apparatus 20C connected to the client terminal 10. The output apparatuses 20A, 20B and 20C are called "the output apparatus 20" in the following description if there is no need to distinguish between each of the output apparatuses. The present invention will be described with an assumption that the print system 100 is located at a drug department in the hospital. But the present invention is not limited to such a situation.

The client terminal 10 is an information processing apparatus used by a user such as a Personal Computer (PC). The client terminal 10 may be stationary or portable. A mobile phone and a smart device may be applied as the client terminal 10. The print system 100 includes one or more of the client terminals 10. For example, each of a plurality of staff members in the drug department has the client terminal 10.

The output apparatus 20 is an image forming apparatus such as a printer. The shared output apparatuses 20A and 20B are the image forming apparatuses connected with the client terminal 10 via the network 30. The local output apparatus 20C is the image forming apparatus connected to the client terminal 10 directly by a wired cable communication or a wireless communication such as a Bluetooth. The output apparatus 20 may be not only the image forming apparatus such as a printer, a copier, a multifunction peripheral (MFP) and a laser printer (LP), also a displaying apparatus outputting a screen data, such as a projector and a monitor, and an audio output apparatus outputting audio data. The print system 100 includes one or more of the output apparatus 20.

Figure 2:
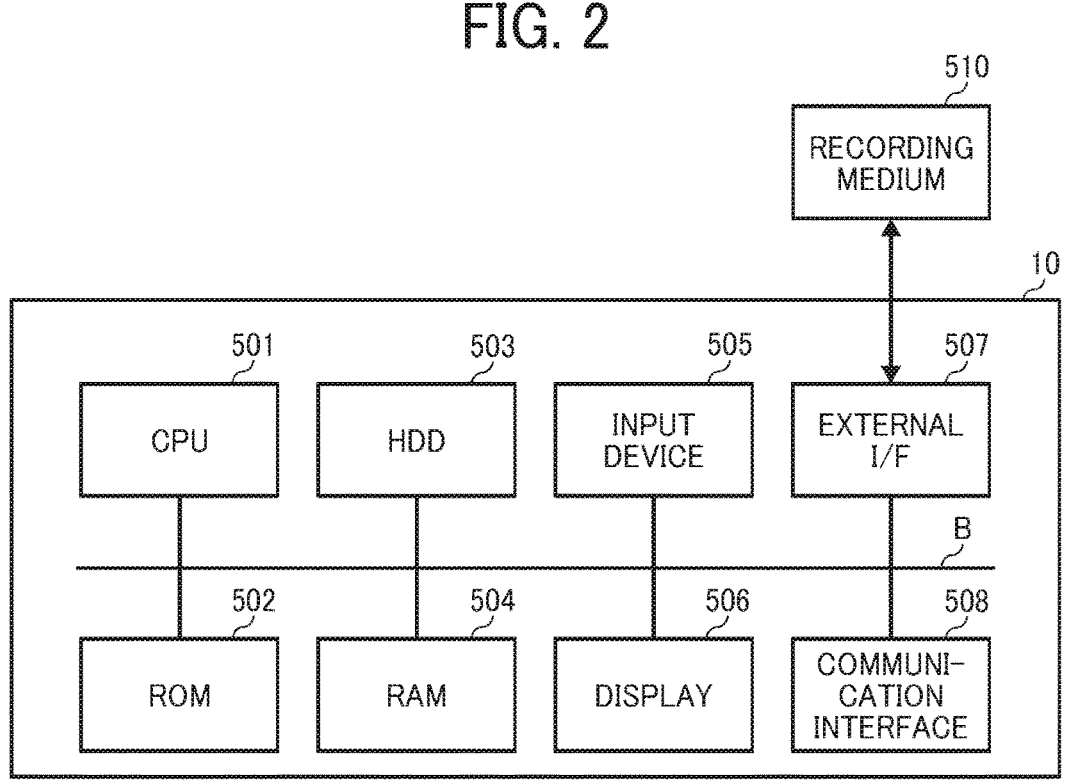
FIG. 2 illustrates an exemplary hardware configuration of the client terminal 10 of the exemplary print system.

FIG. 2 illustrates an exemplary hardware configuration of the client terminal 10 of the exemplary print system 100. As shown in FIG. 2, the client terminal 10 includes a central processing unit (CPU) 501, a read-only memory (ROM) 502, a hard disk drive (HDD) 503, a random access memory (RAM) 504, an input device 505 such as a keyboard and/or touch screen and/or mouse, a display 506, an external interface (I/F) 507 and a communication interface (I/F) 508 connected to each other via a bus B.

The CPU 501 is an arithmetic unit performing overall control and various functions by reading programs and data stored in a storage device or memory such as the ROM 502 and the HDD 503 to the RAM 504 and executing processes.

The ROM 502 is one example of a non-volatility semiconductor memory which is a storage device and stores the programs and data without the need for power within the client terminal 10. The ROM 502 stores programs and data such as a BIOS, OS settings and network settings executed upon activation.

The HDD 503 is one example of a non-volatile storage device storing programs and data. The HDD 503 stores software programs including basic software for overall control at the client terminal 10 such as OS and application software performing functions operated on the OS. Hereinafter, the application software will be referred to as a "application". The client terminal 10 may include a drive device using a flash memory as a storage medium, for example a solid state drive (SSD), instead of the HDD 503.

The RAM 504 is one example of a volatile storage device storing programs and data. The RAM 504 performs function as a work area to execute processes by the CPU 501.

The input device 505 is a device used for a user inputting a variety of operation signals. For example, the input device 505 may comprise a keyboard, a mouse or a touch panel. The display 506 is a device displaying a variety of information such as a result of processes. For example, the display 506 may comprise a liquid crystal display device. The input device 505 and the display 506 may be integrated such as a touch panel. The input device 505 and the display 506 may be separated from the client terminal 10 and connectable to the client terminal 10.

The external I/F 507 is an interface to an external apparatus. The FIG. 2 shows a recording medium 510 as one example of the external apparatus. However the external apparatus is not limited to the recording medium 510. The client terminal 10 may read data from the recording medium 510 and write data to the recording medium 510. The recording medium may include a flexible disk, a CD, a DVD, a secure digital (SD) memory card and a universal serial bus (USB) memory.

The communication I/F 508 is an interface for connecting to the network 30. The client terminal 10 is able to connect to the network 30 via the communication I/F 508.

Figure 3:
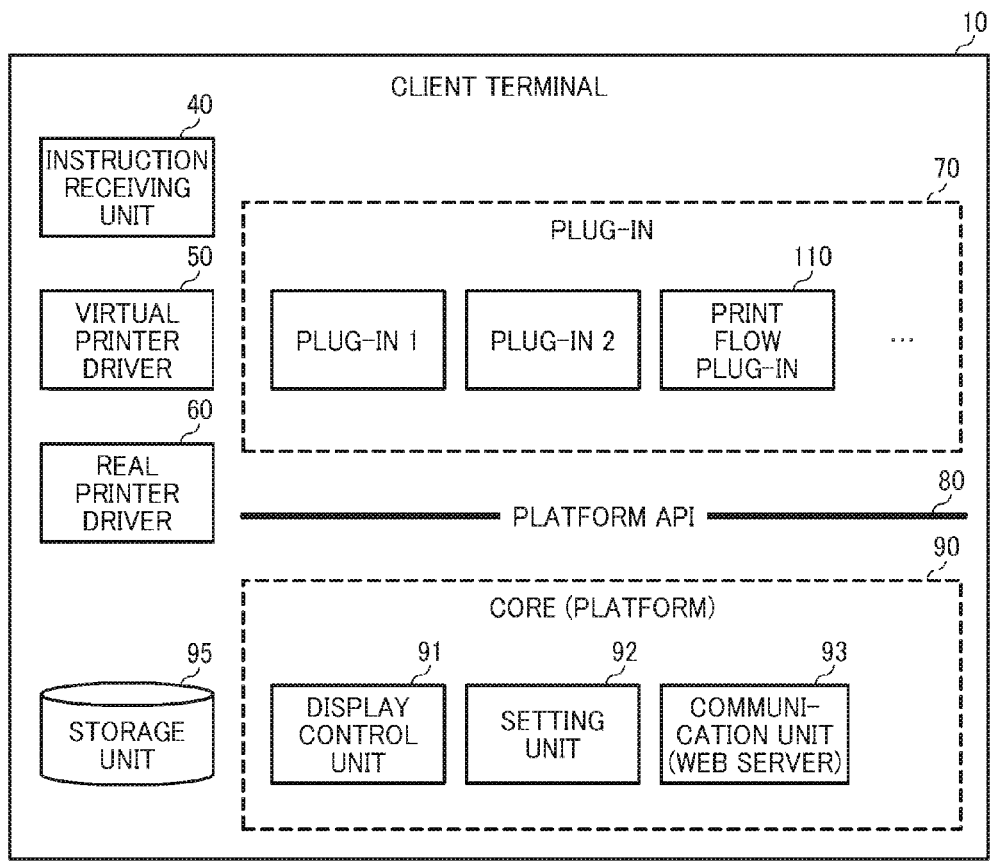
FIG. 3 illustrates an exemplary functional configuration of the client terminal.

FIG. 3 illustrates an exemplary functional configuration of the client terminal 10. The client terminal 10 may include an instruction receiving unit 40, a virtual printer driver 50, a real printer driver 60, a plug-in 70, a platform application interface (API) 80 and a platform 90 executing programs implemented by the CPU 501 of the client terminal 10. The client terminal also may include a storage unit 95 of the client terminal 10 implemented, for example, by the ROM 502 or the HDD 503.

The functionality of the instruction receiving unit 40 is performed by the application for creating a document of prescription. The instruction receiving unit 40 sends created document data of prescription to the virtual printer driver 50 when the instruction receiving unit 40 receives a print request of one or more prescriptions from the user. In this case, the created document corresponding to one prescription consists of a document for pharmaceutical products information, a document for a first medicine bag and a document for a second medicine bag per one prescription. The application implementing the instruction receiving unit 40 embeds a same number to three documents corresponding to one prescription. Thus, each number identifies each prescription. The embedded number increases in order. For example, three documents of the first prescription are embedded with the number "1", three documents of the second prescription are embedded with the number "2", and three documents of the third prescription are embedded with the number "3", etc. How to use this embedded number will be described later.

The virtual printer driver 50 is a printer driver which transforms the created document data from the instruction receiving unit 40 into intermediate print data that is independent of a printer, and outputs the intermediate print data. The intermediate print data is a print data that is independent of the type of the output apparatus 20. The intermediate print data is one example of output data.

The real printer driver 60 is a printer driver which transforms intermediate print data into real print data in a format which can be printed by the output apparatus 20, and outputs the real print data to the output apparatus 20. For example, data in the RAW image format is an example of the real printing data.

The plug-in 70 is software which operates on the platform 90. The plug-in 70 is capable of using a function of the platform 90 by using the platform API 80. FIG. 3 shows the plug-in 70 including a plug-in 1, a plug-in 2 and a print flow plug-in 110. However the plug-in 70 may include at least the print flow plug-in 110 in the present embodiment. The print flow plug-in 110 determines output destination of the intermediate print data, and controls to cause the output apparatus 20 determined as the output destination to output the real print data. Details will be described later.

The platform API 80 provides an interface for enabling the plug-in 70 to use a function of the platform 90. The platform API 80 is a pre-defined interface which is provided to enable the platform 90 to receive a request from the plug-in 70. For example, the platform API 80 is provided to include a set of functions, a set of classes, etc.

The platform 90 includes a display control unit 91, a setting unit 92, and a communication unit 93. The display control unit 91 displays a setting screen. The setting unit 92 sets up the plug-in 70. The communication unit 93 communicates with an external apparatus, and may be implemented as a web server, for example. The storage 95 stores a variety of data such as setting data.

Figure 4:
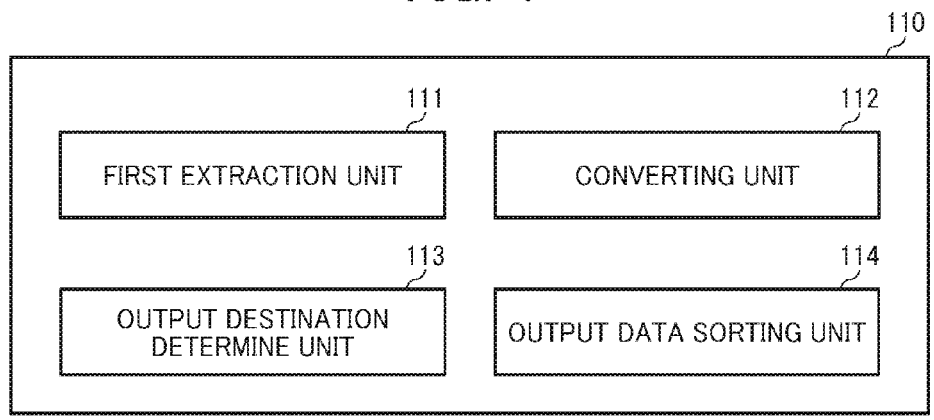
FIG. 4 illustrates an exemplary functional configuration of the print flow plug-in in the client terminal.

FIG. 4 illustrates an exemplary functional configuration of the print flow plug-in 110 of the client terminal 10. As shown in FIG. 4, the print flow plug-in 110 includes a first extraction unit 111, a converting unit 112, an output destination determine unit 113 and a output data storing unit 114.

The first extraction unit 111 extracts metadata from output data. The metadata is related to the output data. At the present embodiment, the first extraction unit 111 extracts the embedded number information as the metadata from the intermediate print data. An embedded region of the number information to the output data is set in the storage unit 95 by the setting unit 92. The first extraction unit 111 extracts the embedded number information from the embedded region of the intermediate print data based on the embedded region set by the setting unit 92.

The converting unit 112 converts the number information as the metadata to judgement information used for determining whether a first condition is satisfied or not. The first condition is to determine one output apparatus 20 as output destination. The judgement information is the number of the remainder obtained by dividing the embedded number by the number of the output apparatuses 20. For example, the number of output apparatuses 20 is three in the FIG. 1. Details will be described later.

The output destination determine unit 113 determines the output apparatus 20 as the output destination of the output data based on the embedded meta data extracted by the first extraction unit and condition information including at least the first condition. The output destination determine unit 113 determines the output apparatus 20 as the output destination of the output data based on the judgment information converted based on the metadata by the converting unit 112 and the condition information. The first condition set by each output apparatus 20 indicates the number of judgement information matches specific number corresponding to the output apparatus 20, and each output apparatus 20 has a different specific number. The first condition may be a condition for determining one of a catch tray included in the output apparatus 20 as the output destination. Details will be described below.

FIG. 5 illustrates a table of an exemplary configuration of the condition information. As described in FIG. 1, the condition information comprises three sets of rule information of which each corresponds to the output apparatuses 20A, 20B and 20C respectively. One set of rule information includes an item of ID, rule, condition and action in association with each other. The rule information corresponding to the output apparatus 20A includes the ID "1", the rule indicating if the judgement information is "001", the output data outputs to the output apparatus 20A, the condition indicating the judgement information is "001", and the action indicating the output apparatus 20A is the output destination. In this example, this rule information is the first condition for determining the output destination of the output data is the output apparatus 20A. And the specific number of the output apparatus 20A is "001".

Similarly, the rule information corresponding to the output apparatus 20B includes the ID "2", the rule indicating if the judgement information is "002", the output data outputs to the output apparatus 20B, the condition indicating the judgement information is "002", and the action indicating the output apparatus 20B is the output destination. In this example, this rule information is the first condition for determining the output destination of the output data is the output apparatus 20B. And the specific number of the output apparatus 20B is "002".

Similarly, the rule information corresponding to the output apparatus 20C includes the ID "3", the rule indicating if the judgement information is "000", the output data outputs to the output apparatus 20C, the condition indicating the judgement information is "000", and the action indicating the output apparatus 20C is the output destination, In this example, this rule information is the first condition for determining the output destination of the output data is the output apparatus 20C. And the specific number of the output apparatus 20B is "000".

The output destination determine unit 113 determines the output destination is the output apparatus 20A if the judgement information indicates "001", the output destination is the output apparatus 20B if the judgement information indicates "002", and the output destination is the output apparatus 20C if the judgement information indicates "000"

The judgement information may be stored in the storage unit 95 or by the print flow plug-in 110.

The output data sorting unit 114 sorts the output data into the output apparatus 20. The output data sorting unit 114 distributes the output data to the output apparatus 20 based on the determination by the output destination determine unit 113. The output data sorting unit 114 requests to print the intermediate print data to the real printer driver 60 corresponding to the output apparatus 20 designated as the output destination by the output destination determine unit 113. The real printer driver 60 generates the print data from the intermediate print data and requests the output apparatus 20 preset as the output destination of the real printer driver 60 to print the print data.

FIG. 6 illustrates a flowchart of an exemplary process performed by the print flow plug-in 110. As illustrated by FIG. 6, the first extraction unit 111 extracts, from the intermediate print data, a number embedded in the intermediate print data as the metadata by the application of the instruction receiving unit 40 (Step S1). The converting unit 112 converts the extracted number to the judgement information (Step S2). The print flow plug-in 110 executes scenario process for sorting the intermediate print data to output destination.

Figure 7:
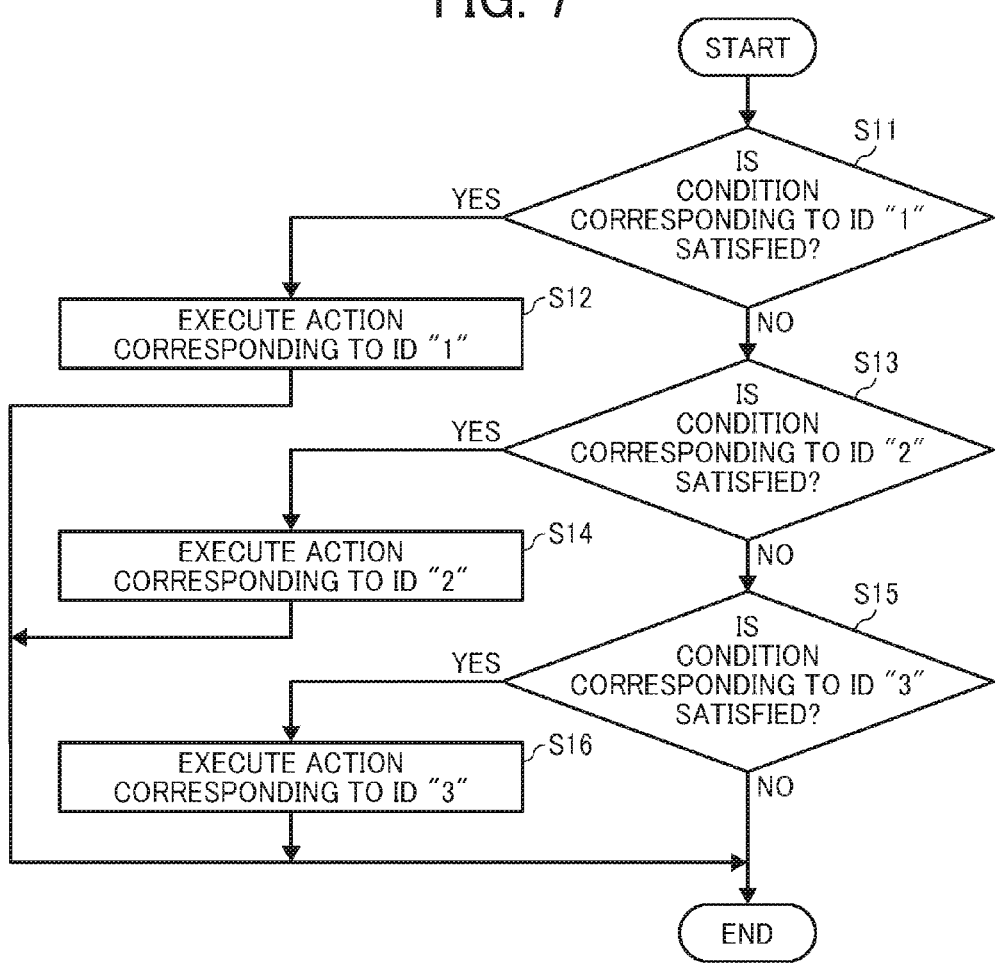
FIG. 7 illustrates a flowchart of an exemplary scenario process performed by the print flow plug-in in the client terminal.

FIG. 7 illustrates a flowchart of an exemplary scenario process performed by the print flow plug-in 110. As illustrated by FIG. 7, the output destination determine unit 113 determines whether the condition associated with the ID "1" is satisfied or not (Step S11). If the output destination determine unit 113 determine that the condition is satisfied at the step S11 (Step S11, Yes), the print flow plug-in 110 executes the action associated with the ID "1" (Step S12). In detail, the output destination determine unit 113 determines the output destination is the output apparatus 20A, and the output data sorting unit 114 sends the intermediate print data to the real printer driver corresponding to the output apparatus 20A and requests to print the print data generated from the sent intermediate print data.

If the output destination determine unit 113 determines that the condition is not satisfied at the step S11 (Step S11, No), the output destination determine unit 113 determines whether the condition associated with the ID "2" is satisfied or not (Step S13). If the output destination determine unit 113 determines that the condition is satisfied at the step S13 (Step S13, Yes), the print flow plug-in 110 executes the action associated with the ID "2" (Step S14). in detail, the output destination determine unit 113 determines the output destination is the output apparatus 20B, and the output data sorting unit 114 sends the intermediate print data to the real printer driver corresponding to the output apparatus 20B and requests to print the print data generated from the sent intermediate print data.

If the output destination determine unit 113 determines that the condition is not satisfied at the step S11 (Step S13, No), the output destination determine unit 113 determines whether the condition associated with the ID "3" is satisfied or not (Step S15). If the output destination determine unit 113 determines that the condition is satisfied at the step S15 (Step S15, Yes), the print flow plug-in 110 executes the action associated with the ID "3" (Step S16). In detail, the output destination determine unit 113 determines the output destination is the output apparatus 20C, and the output data sorting unit 114 sends the intermediate print data to the real printer driver corresponding to the output apparatus 20C and requests to print the print data generated from the sent intermediate print data.

As described above, the client terminal 10 stores the rule information of which the number corresponds to the number of output apparatus 20 as output destination target.

<Modification of the First Embodiment>

Figure 8:
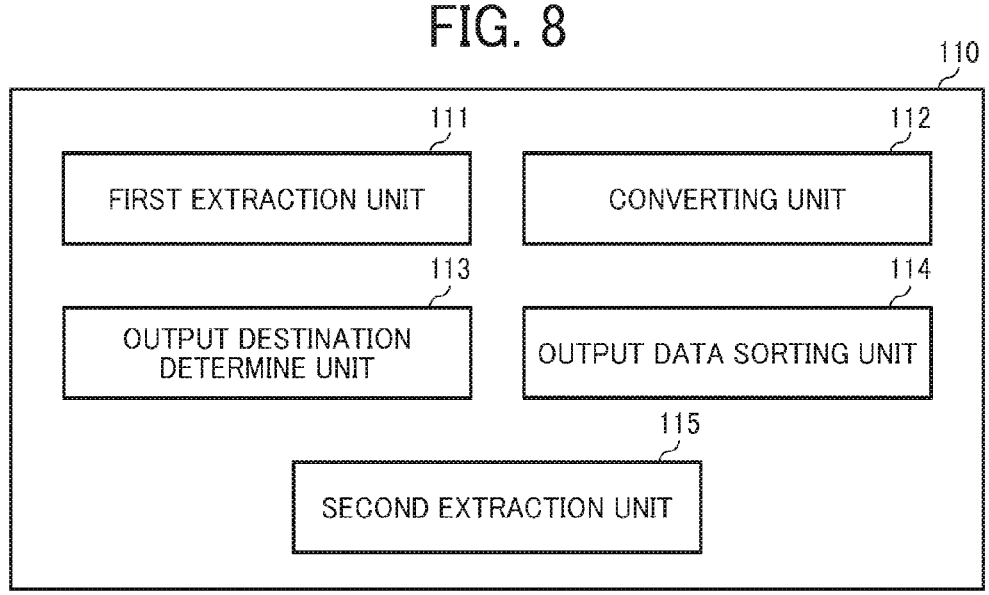
FIG. 8 illustrates an exemplary functional configuration of the print flow plug-in in the client terminal.

FIG. 8 illustrates an exemplary functional configuration of the print flow plug-in 110 according to the modification of the first embodiment. As described by FIG. 8, the print flow plug-in 110 also may include a second extraction unit 115.

The second extraction unit 115 extracts predetermined keyword from the output data. More specifically, the second extraction unit 115 extracts any one of a plurality of the predetermined keywords from the output data. In this example, the plurality of the predetermined keywords are one or more keywords related to the pharmaceutical products information such as "Description of your medicine", one or more keywords related to the first medicine bag such as "External medicine" or "Oral medicine", and one or more keywords related to the second medicine bag. The second extraction unit 115 extracts any one of the plurality of the keywords related to the pharmaceutical products information and the first and second medicine bag from the intermediate print data.

In the modification of the first embodiment, the output destination determine unit 113 determines the output apparatus 20 as the output destination of the output data if one of the keywords is extracted by the second extraction unit 115 and the metadata is extracted by the first extraction unit 111. In other words, the output destination of the output data is determined by the output destination determine unit 113 when the print flow plug-in determines that the output data is related to the prescription.

Also, the output data sorting unit 114 associates the specific number corresponding to the output apparatus 20 of the determined output destination with the keyword extracted by the second extraction unit 115 every time the output apparatus 20 as the output destination is determined by the output destination determine unit 113. And when all of the plurality of the predetermined keywords are associated with the specific number, the output data sorting unit 114 sends plural sets of the output data of which each includes any one of the associated keywords to the output apparatus 20 corresponding to the specific number via the real printer driver.

For example, assume a case that all three keywords consisting of the keyword corresponding to the pharmaceutical products information, the keyword corresponding to the first medicine bag and the keyword corresponding to the second medicine bag are associated with the specific number "001" corresponding to the output apparatus 20A as a result of above association processes, the output data sorting unit 114 sorts one set of three pieces of the intermediate print data consisting of document of the pharmaceutical products information, document of the first medicine bag and document of the second medicine bag which are equal to one prescription document. Therefore, the output apparatus 20 outputs the output data by one prescription.

<Second Embodiment>

In the description about the second embodiment, the explanation of portions in common with the first embodiment is omitted to reduce redundancy.

In the present embodiment, the metadata indicates character string written in a specific location of the output data. In this example, the metadata is treated as a patient name because a patient name who should receive the prescription is written in the specific location.

Figures 9, 10:
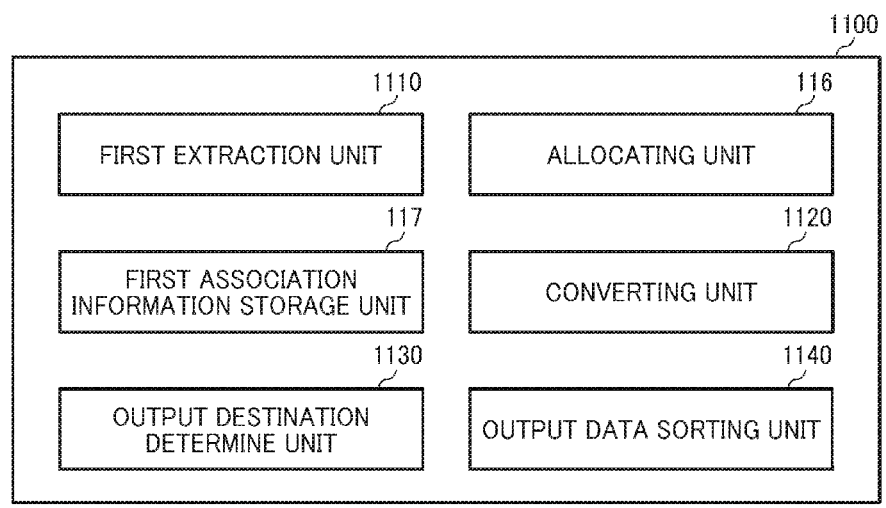
FIG. 9 illustrates an exemplary functional configuration of the print flow plug-in in the client terminal.
FIG. 10 illustrates a table of an exemplary configuration of the first association information.

FIG. 9 illustrates an exemplary functional configuration of the print flow plug-in 1100. As illustrated by FIG. 9, the print flow plug-in 1100 may include a first extraction unit 1110, an allocating unit 116, a first association information storage unit 117, a converting unit 1120, an output destination determine unit 1130 and an output data sorting unit 1140.

The first extraction unit 1110 extracts the meta data from the output data. The first extraction unit 1110 extracts, from the intermediate print data received from the virtual printer driver 50, the character string written in the specific location of the intermediate print data.

The allocating unit 116 allocates a number to the extracted character strings. The allocated number is to identify the extracted character string. The allocating unit 116 registers the allocated number and the extracted character strings in the first association information storage unit 117. The first association information storage unit 117 stores first association information registering the allocated number and the extracted character string in association with each other.

FIG. 10 illustrates a table of an exemplary configuration of the first association information. The first association information includes the allocated number, the character string indicating a patient name and date information indicating a date and time outputting the intermediate print data in association with each other. Hereafter, one of the sets of the allocated number, the extracted character string and date information will be referred to as an "entry".

When the extracted character string has already been stored in the first association information storage unit 117, the allocating unit 116 does not allocate a new number to the extracted character string. However when the time difference between two date information about the same character string exceeds the threshold value, the allocating unit 116 allocates a new number to the extracted character string and registers in the first association information because same patient may receive a plural prescription in the hospital. Therefore, the threshold value is set properly.

The print flow plug-in 1100 may delete the entry corresponding to the output data having been printed, or all entries at the end of the day.

The converting unit 1120 converts the allocated number to the judgement information. A converting method is the same as the first embodiment.

Figure 11:
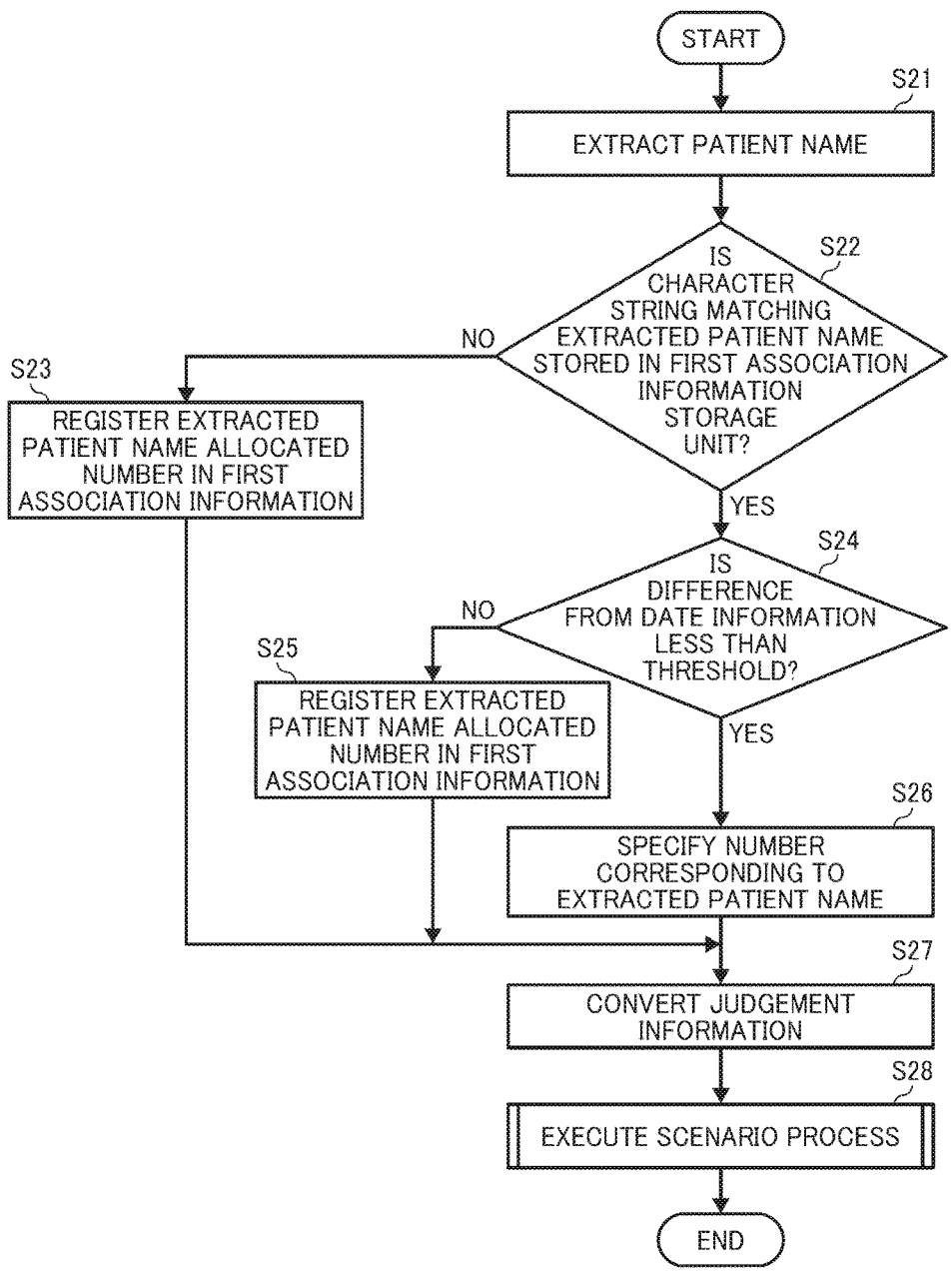
FIG. 11 illustrates a flowchart of an exemplary process performed by the print flow plug-in in the client terminal.

FIG. 11 illustrates a flowchart of an exemplary process performed by the print flow plug-in 1110. As illustrated by FIG. 11, the first extraction unit 1110 extracts the character string from the specific location of the intermediate print data (Step S21). The allocating unit 116 determines whether the character string extracted in the step S21 has already been stored in the extracted character string in the first association information storage unit 117 (Step S22).

If the allocating unit 116 determines the extracted character string is not stored in the first association information storage unit 117 (Step S22, No), the allocating unit 116 allocates the number for identifying the extracted character string and registers the allocated number and the extracted character string in the first association information. The converting unit 1120 converts the allocated number to judgement information (Step S27). The print flow plug-in 1100 executes scenario process (Step S28).

If the allocating unit 116 determines the extracted character string is stored in the first association information storage unit 117 (Step S22, No), the allocating unit 116 determines whether the time difference between first date information and second date information is less than the threshold value or not (Step S24). The first date information indicates the date information corresponding to the extracted character string stored in the first association information. The second date information indicates the date information of the intermediate print data received from the virtual printer driver at the step S21.

If the allocating unit 116 determines the time difference between the first date information and the second date information is not less than the threshold value (Step S24, No), the allocating unit 116 allocates the number for identifying the extracted character string and registers the allocated number and the extracted character string in the first association information (Step S25). Then shift to the process of the step S27.

If the allocating unit 116 determines the time difference between the first date information and the second date information is less than the threshold value (Step S24, Yes), the allocating unit 116 specifies the allocated number stored in the first association information and associated with the extracted character string (Step S26). Then the process shifts to the process of the step S27.

<Third Embodiment>

In the description about the third embodiment, an explanation of the portions in common with the above embodiments is omitted.

Figures 12, 13, 14:
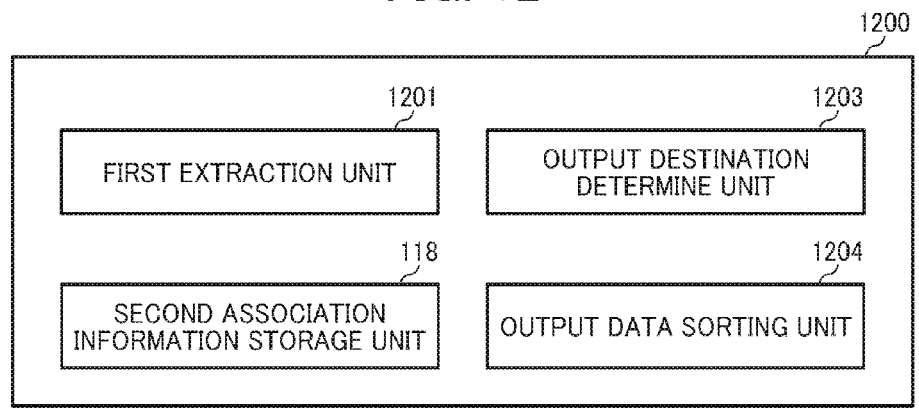
FIG. 12 illustrates an exemplary functional configuration of the print flow plug-in in the client terminal.
FIG. 13 illustrates a table of an exemplary configuration of the second association information.
FIG. 14 illustrates one example of the selection screen of the exemplary print system.

FIG. 12 illustrates an exemplary functional configuration of the print flow plug-in 1200. As illustrated by FIG. 12, the print flow plug-in 1200 may include a first extraction unit 1201, an output destination determine unit 1203, a second association information storage unit 118, and an output data sorting unit 1204. The converting unit 112 or 1120 may be not included in this embodiment.

The first extraction unit 1201 extracts a first keyword or a second keyword as a metadata. In the present embodiment, one set of documents including the prescription and the bill is printed, and the prescription is printed before the bill. The first keyword is "prescription", and the second keyword is "bill". The keyword is not limited this example.

The output destination determine unit 1203 determines the output apparatus 20 as the output destination of the output data. Detail is described later. In the present embodiment, a first condition corresponding to each output apparatus 20 in the condition information indicates that the first keyword is extracted by the first extraction unit 1201 and the output apparatus 20 is non-output status. More specifically, the non-output status indicates that there is no paper on the catch tray of the output apparatus 20

When the output destination determine unit 1203 determines the output apparatus 20 as the output destination of the output data extracting the first keyword, it specifies a character string written in a first location of the output data and registers second association information associated the specified character string with the output apparatus 20 determined as the output destination in the second association information storage unit 118. The second association information storage unit 118 stores the second association information. The present embodiment shows one example in which the first keyword is the patient name because the first location indicates an entry field in which the patient name is written.

FIG. 13 illustrates a table of an exemplary configuration of the second association information. The second information consists of one or more entries of which each includes an entry ID, a patient name, an output destination and date information in association with each other. The print flow plug-in 1200 may delete the entry corresponding to the output data having been printed, or all entries at the end of the day.

The condition information according to the present embodiment also includes a second condition for determining the output apparatus 20 corresponding to the character string matching a character string written in a second location of the output data including the second keyword as the output destination of the output data. The second condition indicates that the second keyword is extracted by the first extraction unit 1201, and the second association information includes the character string written in the second location of the output data including the second keyword.

The condition information according to the present embodiment also includes a third condition for determining the output apparatus 20 selected via a selection screen as the output destination of the output data. The third condition indicates that the first keyword is extracted by the first extraction unit 1201 and the non-output status output apparatus does not exist.

FIG. 14 illustrates one example of the selection screen. When a user selects "OK" button 300, the output apparatus selected via the selection screen is the output destination. When the user selects a pull-down list button 301, a list of the output apparatus 20 is displayed, and the user selects the output apparatus 20 as the output destination from among the list. Also when the user selects "cancel" button 302, the output data is discard.

FIG. 15 illustrates a table of an exemplary configuration of the condition information. One set of rule information including an ID, a rule, a condition and an action associated with each other.

The rule information of ID "1" includes the rule indicating that the output apparatus 20 corresponding to the character string matching one of the patient name written in the intermediate print data including the keyword "bill" is output destination, the condition indicating that the keyword "bill" is extracted and the character string matching the patient name included in the intermediate print data stores in the second association information storage unit 118, the action indicating that the output apparatus 20 corresponding to the character string is the output destination.

The rule information of ID "2" includes the rule indicating that the output apparatus 20A is the output destination of the output data if the keyword "prescription" is extracted and the output apparatus 20A is non-output status, the condition indicating that the keyword "prescription" is extracted and there is no paper on the catch tray of the output apparatus 20A, the action indicating that the output data outputs to the output apparatus 20A determined as the output destination.

The rule information of ID "3" includes the rule indicating that the output apparatus 20B is the output destination of the output data if the keyword "prescription" is extracted and the output apparatus 20B is non-output status, the condition indicating that the keyword "prescription" is extracted and there is no paper on the catch tray of the output apparatus 20B, the action indicating that the output data outputs to the output apparatus 20B determined as the output destination.

The rule information of ID "4" includes the rule indicating that the output apparatus 20C is the output destination of the output data if the keyword "prescription" is extracted and the output apparatus 20C is non-output status, the condition indicating that the keyword "prescription" is extracted and there is no paper on the catch tray of the output apparatus 20C, the action indicating that the output data outputs to the output apparatus 20C determined as the output destination.

The rule information of ID "5" includes the rule indicating that the output apparatus 20 selected via the selection screen is the output destination of the output data if the keyword "prescription" is extracted and all of the output apparatuses 20A, 20B and 20C are not non-output status, the condition indicating that the keyword "prescription" is extracted and there is a paper on the catch tray of any of the output apparatuses 20A, 20B and 20C, the action indicating that the selection screen display and the output data outputs to the output apparatus 20 selected via the selection screen.

Figure 16:
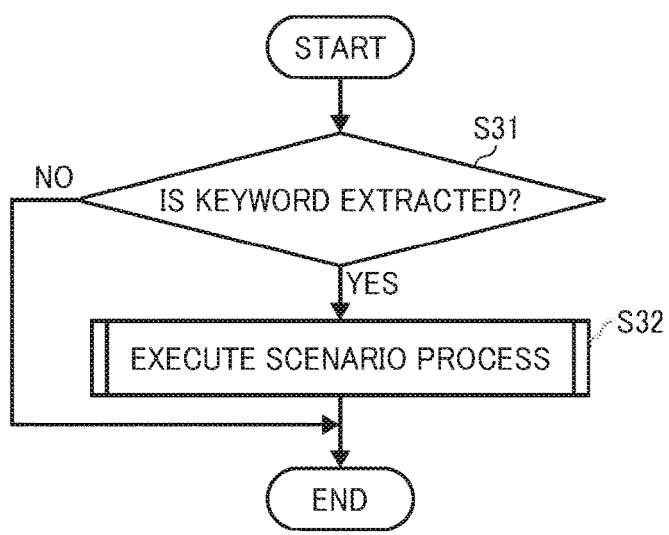

FIG. 16 illustrates a flowchart of an exemplary process performed by the print flow plug-in 1200. As illustrated by FIG. 16, the first extraction unit 1201 extracts any one of keyword "prescription" and "bill" from the intermediate print data received from the virtual printer driver 50 (Step S31). If any one of keywords is extracted (Step S31, Yes), the print flow plug-in 1200 executes the scenario process. If any one of keywords is not extracted (Step S31, No), the scenario process is not executed by the print flow plug-in 1200.

FIG. 17 illustrates a flowchart of an exemplary scenario process performed by the print flow plug-in 1200. As illustrated by FIG. 16, the output destination determine unit 1203 determines whether the keyword "prescription" is extracted or not (Step S41).

If the output destination determine unit 1203 determines the keyword "prescription" is extracted (Step S41, Yes), the output destination determine unit 1203 determines whether the condition corresponding to the ID "2" described in FIG. 15 is satisfied or not (Step S42). For example, the output destination determine unit 1203 requests a status of the catch tray of the output apparatus 20A to the output apparatus 20A, and receives the response to the request. Or, the output apparatus 20 notifies the status of the catch tray to the print flow plug-in 1200 when all paper on the catch tray is removed.

If the output destination determine unit 1203 determines the condition corresponding to the ID "2" is satisfied (Step S42, Yes), the output destination determine unit 1203 executes the action corresponding to the satisfied condition (Step S43). More specifically, the print flow plug-in 1200 outputs the intermediate print data to the output apparatus 20A via the real printer driver 60.

If the output destination determine unit 1203 determines the condition corresponding to the ID "2" is not satisfied (Step S42, No), the output destination determine unit 1203 determines whether the condition corresponding to the ID "3" described in FIG. 15 is satisfied or not (Step S44). If the output destination determine unit 1203 determines the condition corresponding to the ID "3" is satisfied (Step S44, Yes), the output destination determine unit 1203 executes the action corresponding to the satisfied condition (Step S45). More specifically, the print flow plug-in 1200 outputs the intermediate print data to the output apparatus 20B via the real printer driver 60.

If the output destination determine unit 1203 determines the condition corresponding to the ID "3" is not satisfied (Step S44, No), the output destination determine unit 1203 determines whether the condition corresponding to the ID "4" described in FIG. 15 is satisfied or not (Step S46). If the output destination determine unit 1203 determines the condition corresponding to the ID "4" is satisfied (Step S46, Yes), the output destination determine unit 1203 executes the action corresponding to the satisfied condition (Step S47). More specifically, the print flow plug-in 1200 outputs the intermediate print data to the output apparatus 20C via the real printer driver 60.

If the output destination determine unit 1203 determines the condition corresponding to the ID "4" is not satisfied (Step S46, No), the output destination determine unit 1203 determines whether the condition corresponding to the ID "6" described in FIG. 15 is satisfied or not (Step S48). More specifically, the output destination determine unit 1203 displays the selection screen and determines the output apparatus selected via the selection screen as the output destination. And then the print flow plug-in outputs the intermediate print data to the selected output apparatus 20 via the real printer driver 60.

If the output destination determine unit 1203 determines the keyword "bill" is extracted (Step S41, No), the output destination determine unit 1203 determines whether the condition corresponding to the ID "1" described in FIG. 15 is satisfied or not (Step S49).

If the output destination determine unit 1203 determines the condition corresponding to the ID "1" is satisfied (Step S49, Yes), the output destination determine unit 1203 executes the action corresponding to the satisfied condition (Step S50).

<Modification of Third Embodiment>

The condition information may include a fourth condition and a fifth condition instead of the third condition. The fourth condition is to determine the output data included in the first keyword is stored in an output data storage. The fifth condition is to determine the output apparatus 20 sending a notification of non-output status as the output destination of the output data being oldest in the output data storage.

The fourth condition indicates that the first keyword is extracted and all of the output apparatuses 20A, 20B and 20C are not non-output status. The fifth condition indicates that any one of the output apparatuses 20A, 20B and 20C is non-output status, and output data is stored in the output data storage.

FIG. 18 illustrates one example of the condition information. The rule information from ID "1" to ID "4" is the same as the above third embodiment.

The rule information of ID "5" includes the rule indicating that the output data is stored in the output data storage if the keyword "prescription" is extracted and all of the output apparatuses 20A, 20B and 20C are not non-output status, the condition indicating that the keyword "prescription" is extracted and there is a paper on the catch tray of all of the output apparatuses 20A, 20B and 20C, the action indicating that the output data is stored in the output data storage.

The rule information of ID "6" includes the rule indicating that the output data stored in the output data storage outputs the non-output status output apparatus if any one of the output apparatuses 20A, 20B and 20C change the status from output status to non-output status, the condition indicating that the notification of the non-output status is received and the output data storage unit stores the output data, the action indicating that the output data outputs to the output apparatus 20 sending the notification.

An information processing system, an information processing apparatus such as an image forming apparatus, a document distributing apparatus, and a document management apparatus according to the embodiments of the present disclosure are described above. However, embodiments in accordance with this application may include variations and modifications may be made without departing from the scope of this application. For example, circuitry of an information processing system, a user terminal and a data processing system may execute a method in accordance with the present disclosure. The circuitry may include a programmed processor, as a processor includes circuitry.

The functions and features described herein may also be executed by various distributed components of a system. For example, one or more processors may execute these system functions, wherein the processors are distributed across multiple components communicating in a network. The distributed components may include one or more client and server machines, which may share processing in addition to various human interface and communication devices (e.g., display monitors, smart phones, tablets, and PDAs.

Moreover, embodiments in accordance with the present disclosure may utilize circuitry, dedicated hardware or a mixture of dedicated hardware and and/or circuitry executing software. For example, the present disclosure may be implemented as one or more networked processing apparatuses including circuitry that executes software in accordance with the present disclosure. Processing apparatuses in accordance with the present disclosure may comprise any suitably programmed apparatuses such as a general purpose computer, personal digital assistant, mobile telephone (such as a WAP or 3G-compliant phone) or other digital device including circuitry.

Aspects of the present disclosure may encompass computer software that is executed by circuitry, processing circuitry, or another programmable device. The computer software may be provided to the programmable device using any storage medium for storing processor readable code such as a floppy disk, hard disk, CD-ROM, magnetic tape device, solid state or other memory device.

The invention claimed is:

1. An information processing apparatus, comprising:
   circuitry configured to:
   extract metadata from output data including one or more sets of documents;
   allocate a number to each of the one or more sets of documents, the allocated number corresponding to a number of a plurality of output apparatuses determined based on the extracted metadata including at least two or more keywords predetermined in relation to products information;
   sort one set from the at least two or more keywords, the one set corresponding to a single document;
   determine one of the plurality of output apparatuses, which are connected to each other via a network, as an output destination based on the allocated number and the single document; and
   transmit via the network the output data to the determined output apparatus that performs at least one of printing, displaying, projecting, and audibly outputting the output data for a user.

2. The information processing apparatus as claimed in claim 1, wherein the circuitry is further configured to:
   extract user identification information as the metadata; and
   allocate the number to each of the one or more sets of documents, one set of documents corresponding to the user identification information.

3. A method, comprising:
   extracting metadata from output data including one or more sets of documents;
   allocating a number to each of the one or more sets of documents, the allocated number corresponding to a number of a plurality of output apparatuses determined based on the extracted metadata including at least two or more keywords predetermined in relation to products information;
   sorting one set from the at least two or more keywords, the one set corresponding to a single document;
   determining one of the plurality of output apparatuses, which are connected to each other via a network, as an output destination based on the allocated number and the single document; and
   transmitting via the network the output data to the determined output apparatus that performs at least one of printing, displaying, projecting, and audibly outputting the output data for a user.

4. The method according to claim 3, further comprising:
   extracting user identification information as the metadata; and
   allocating the number to each of the one or more sets of documents, one set of documents corresponding to the user identification information.

* * * * *